United States Patent
Jacob

(10) Patent No.: US 10,000,385 B2
(45) Date of Patent: Jun. 19, 2018

(54) PROCESS OF CONVERTING TEXTILE OR PLASTIC SOLID WASTE INTO ACTIVATED CARBON

(71) Applicant: IsraZion LTD., Haifa (IL)

(72) Inventor: David Jacob, Kfar Yehoshua Moshav (IL)

(73) Assignee: IsraZion Ltd., Haifa (IL)

( * ) Notice: Subject to any disclaimer, the term of this patent is extended or adjusted under 35 U.S.C. 154(b) by 0 days. days.

(21) Appl. No.: 14/781,992

(22) PCT Filed: Apr. 1, 2014

(86) PCT No.: PCT/IB2014/060359
§ 371 (c)(1),
(2) Date: Oct. 2, 2015

(87) PCT Pub. No.: WO2014/162267
PCT Pub. Date: Oct. 9, 2014

(65) Prior Publication Data
US 2016/0039680 A1    Feb. 11, 2016

Related U.S. Application Data

(60) Provisional application No. 61/807,726, filed on Apr. 2, 2013.

(51) Int. Cl.
*B01J 31/00* (2006.01)
*C01B 32/324* (2017.01)
(Continued)

(52) U.S. Cl.
CPC .......... *C01B 32/324* (2017.08); *C01B 32/366* (2017.08); *H01G 11/36* (2013.01);
(Continued)

(58) Field of Classification Search
CPC ... C01B 31/081; C01B 31/086; C01B 32/312; C01B 32/324; C01B 32/372;
(Continued)

(56) References Cited

U.S. PATENT DOCUMENTS 5,382,481 A    1/1995    Fleischer
5,512,391 A    4/1996    Fleischer
(Continued)

FOREIGN PATENT DOCUMENTS

EP    1481409 B1    12/2004
EP    1911053 B1    4/2008

OTHER PUBLICATIONS

Wu, Feng-Chin, and Ru-Ling Tseng. "Preparation of highly porous carbon from fir wood by KOH etching and CO 2 gasification for adsorption of dyes and phenols from water." Journal of Colloid and Interface Science 294.1 (2006): 21-30.*

(Continued)

*Primary Examiner* — Richard M Rump
(74) *Attorney, Agent, or Firm* — Pilloff & Passino LLP

(57) ABSTRACT

The present description relates to activated carbon and methods of making and using the same. The activated carbon is produced from textile and plastic waste materials. The activated carbon may further include graphitic fibers, carbon fibers, CNTs, metals and metal oxides dispersed in the activated carbon matrix. The activated carbon can be in the form of granular manufactures, powder manufactures, nanoparticles, sheets and any other form.

20 Claims, 10 Drawing Sheets

(51) Int. Cl.
*H01G 11/36* (2013.01)
*H01G 11/42* (2013.01)
*H01G 11/46* (2013.01)
*H01G 11/86* (2013.01)
*H01M 4/04* (2006.01)
*C01B 32/366* (2017.01)
*H01M 4/133* (2010.01)
*H01G 11/34* (2013.01)
*H01G 11/44* (2013.01)

(52) U.S. Cl.
CPC .............. *H01G 11/42* (2013.01); *H01G 11/46* (2013.01); *H01G 11/86* (2013.01); *H01M 4/0471* (2013.01); *C01P 2006/12* (2013.01); *C01P 2006/14* (2013.01); *C01P 2006/16* (2013.01); *C01P 2006/40* (2013.01); *H01G 11/34* (2013.01); *H01G 11/44* (2013.01); *H01M 4/133* (2013.01); *Y02T 10/7022* (2013.01)

(58) Field of Classification Search
CPC ........ H01G 11/36; H01G 11/42; H01G 11/46; H01G 11/86; H01G 11/44; H01G 11/34; H01M 4/0471; H01M 4/133; Y02T 10/7022; C01P 2006/40; C01P 2006/14; C01P 2006/12; C01P 2006/16
See application file for complete search history.

(56) References Cited

U.S. PATENT DOCUMENTS

| | | | |
|---|---|---|---|
| 5,643,689 | A | 7/1997 | Fleischer et al. |
| 5,731,105 | A | 3/1998 | Fleischer et al. |
| 5,741,611 | A | 4/1998 | Fleischer et al. |
| 6,225,009 | B1 | 5/2001 | Fleischer et al. |
| 6,558,644 | B1 * | 5/2003 | Berman ................ C01B 31/081 23/314 |
| 6,576,365 | B1 | 6/2003 | Meitav et al. |
| 6,790,556 | B1 | 9/2004 | Meitav et al. |
| 7,687,198 | B2 | 3/2010 | Meitav et al. |
| 8,313,723 | B2 | 11/2012 | Istvan |
| 9,478,365 | B2 | 10/2016 | Mitlin et al. |
| 2002/0127474 | A1 | 9/2002 | Fleischer et al. |
| 2007/0048521 | A1 | 3/2007 | Istvan |
| 2009/0136809 | A1 * | 5/2009 | Wang .................... B82Y 30/00 429/532 |
| 2010/0035093 | A1 | 2/2010 | Ruoff et al. |
| 2014/0328006 | A1 | 11/2014 | Mitlin et al. |

OTHER PUBLICATIONS

Williams, Paul T., and Anton R. Reed. "Development of activated carbon pore structure via physical and chemical activation of biomass fibre waste." Biomass and Bioenergy 30.2 (2006): 144-152.*

Oliveira, Luiz CA, et al. "Activated carbon/iron oxide magnetic composites for the adsorption of contaminants in water." Carbon 40.12 (2002): 2177-2183.*

Taberna, Pierre-Louis, et al. "Activated carbon-carbon nanotube composite porous film for supercapacitor applications." Materials Research Bulletin 41.3 (2006): 478-484.*

Dadvar, Saeed, et al. "The removal of 2-chloroethyl ethyl sulfide using activated carbon nanofibers embedded with MgO and Al2O3 nanoparticles." Journal of Chemical & Engineering Data 57.5 (2012): 1456-1462.*

J.E.W. Broerse et al., "Country Report United Kingdom, Views, Opinions and Ideas of Citizens in Europe on Science," Jun. 2013, Ecsite—the European network of science centres and museums.

P. Kurzweil, "Electrochemical Double-Layer Capacitors," Capacitors, Jan. 2009, pp. 607-633, Elsevier B.V.

Meryl D. Stoller et al., "Best practice methods for determining an electrode material's performance for ultracapacitors," Energy & Environmental Science, May 2010, pp. 1,294-1,301, vol. 3, No. 9, The Royal Society of Chemistry.

Elzbieta Frackowiak et al., "Carbon materials for the electrochemical storage of energy in capacitors," Carbon, May 2001, pp. 937-950, vol. 39, issue 6, Pergamon.

Malachi Noked et al., "Thick vertically aligned carbon nanotube/carbon composite electrodes for electrical double-layer capacitors," Carbon, Jul. 2013, vol. 58, pp. 134-138, Elsevier.

International Search Report for PCT/IB2014/060359 dated Sep. 2, 2014.

Williams et al., "High grade activated carbon matting derived from the chemical activation and pyrolysis of natural fibre textile waste," J. Anal. Appl. Pyrolysis, 2004, vol. 71, pp. 971-986.

Kiran et al. "Recyling of plastic wastes via pyrolysis," Resources, Conservation and Recycling, 2000, vol. 29, pp. 273-283.

* cited by examiner

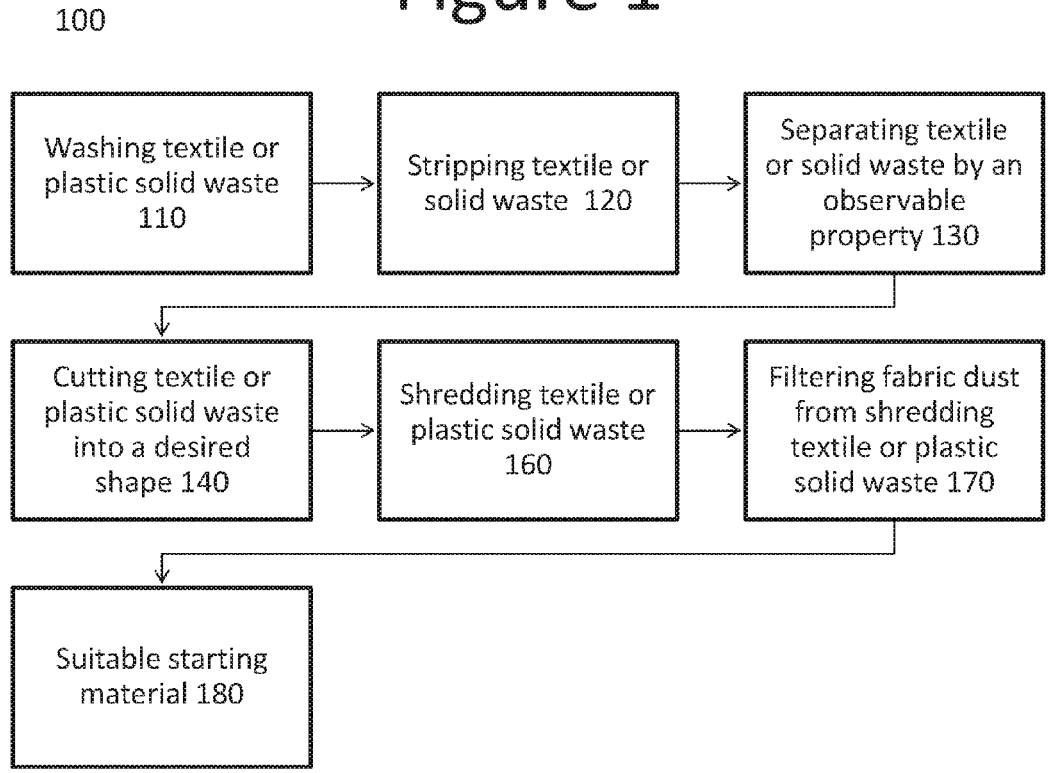

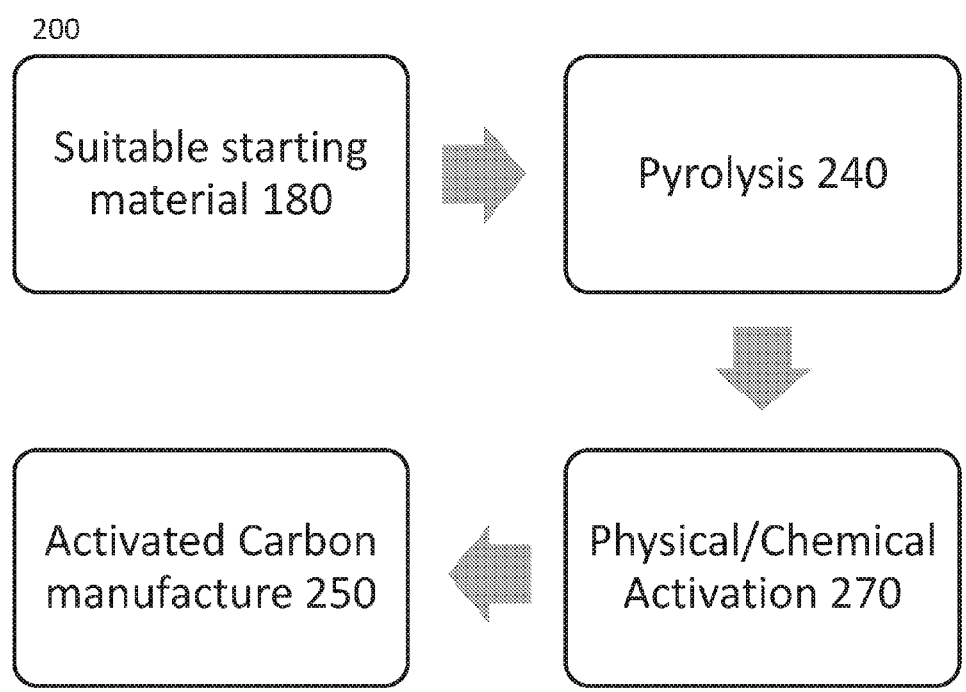

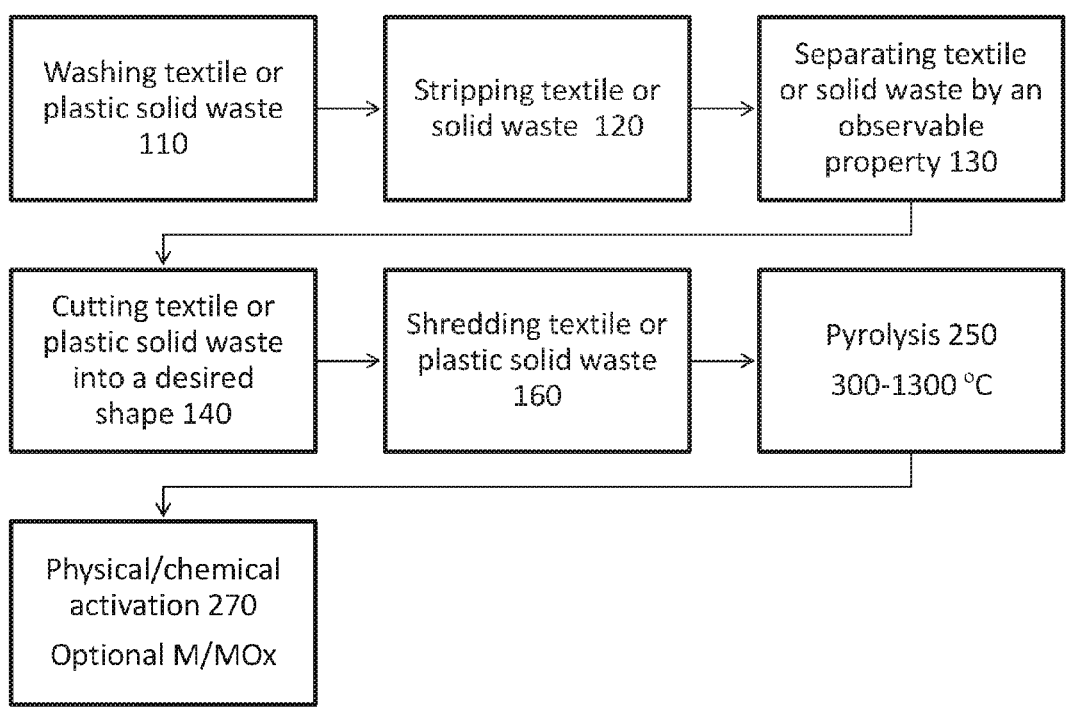

FIGURE 4

| Example no. | Process | Composition | Surface area | Capacity |
|---|---|---|---|---|
| 1 | Other | Carbon | 300-1000 $m^2/g$ | 40-80 F/g |
| 2 | Other + Metal oxide | Carbon +Metal oxide | 300-1000 $m^2/g$ | 40-130 F/g |
| 3 | Other + Metal oxide + carbon fibers | Carbon +Metal oxide+ carbonfiber | 300-1000 $m^2/g$ | 40-130 F/g |
| 4 | Other + Metal oxide + graphite fibers | Carbon +Metal oxide+ graphite fibers | 300-1000 $m^2/g$ | 40-130 F/g |
| 5 | Other + Metal oxide + carbon nanotubes | Carbon +Metal oxide+ carbonanotube | 300-1000 $m^2/g$ | 40-130 F/g |
| 6 | Wet Chemical ($H_2SO_4$) | Carbon | 900-1200 $m^2/g$ | 60-170 F/g |
| 7 | Wet Chemical ($H_2SO_4$)+ Carbon Fibers | Carbon +Carbon Fibers | 900-1200 $m^2/g$ | 60-170 F/g |
| 8 | Wet Chemical ($H_2SO_4$)+ Graphite Fibers | Carbon +Graphite Fibers | 900-1200 $m^2/g$ | 60-170 F/g |
| 9 | Wet Chemical ($H_2SO_4$)+ Carbon Nanotube | Carbon + CNT | 900-1200 $m^2/g$ | 60-170 F/g |

PROCESS OF CONVERTING TEXTILE OR PLASTIC SOLID WASTE INTO ACTIVATED CARBON

CROSS REFERENCE

The present application is the US national stage of PCT/IB2014/060359, filed Apr. 1, 2014. The present application claims priority benefit of 61/807,726, filed Apr. 2, 2013 (now expired), both of these application being incorporated herein by reference in its entirety.

FIELD

The present description concerns a process of converting textile or plastic solid waste into activated carbon containing manufacture. Although suitable for other uses, the resultant manufacture is optionally embedded with graphitic fibers, carbon fibers, carbon nanotubes, metal, or metal oxides. In some embodiments, the activated carbon manufacture is in the form of a supercapacitor or a pseudocapacitor or a ultrabattery (hybrid) in the sense that the activated carbon is usable to manufacture a supercapacitor or pseudocapacitor or ultrabattery.

BACKGROUND

Carbon allotropes are some of the best studied materials for more than 3000 years. The commonly known natural types are the coal, graphite and diamonds. The other synthetic carbons are amorphous carbon, buckminsterfullerene and carbon nanotubes.

Natural sources of carbon are considered as usable, but natural sources are not available universally on the earth. Natural sources can also lead to an environmental crisis.

Hence there are various methods developed by researchers using different carbon "C" containing precursor materials to synthesize carbon. The starting "C" containing precursor may be natural or synthetic materials that contain elemental carbon "C" in its composition.

The most known method to produce carbon is from petroleum byproducts. But there are other common known processes where the natural biomass is converted into carbon material which is environmentally friendly.

The carbonization, preparation process temperature, physical condition and the starting precursor define the amorphous, porous and crystalline characteristic of the carbon.

Amorphous carbon with porous structure (activated carbon) is a well-known material for industrial applications and is in huge demand. The surface area of the activated carbon can reach up to 3000 $m^2/g$.

Most of the activated carbon is produced from charcoal, pet coke, diesel oil, used tires, coconut shell, wood, and agricultural wastes. In practice, coal and coconut shell are the two main sources for the production of activated carbon.

There are two ways for the activation process, namely, physical and chemical activation. The physical activation is done under $CO_2$, dry air and steam ($H_2O$) activating agents, where the activating agent physically adsorbs on the surface of the carbon. In the chemical activation process, the carbon precursor is impregnated with chemical activating agents such as $LiOH$, $H_3BO_3$, $NaOH$, $Na_2CO_3$, $Na_2S_2O_3$, $Na_2S$, $KOH$, $KCl$, $K_2CO_3$, $CaCl_2$, $P_2O_5CsOH$, $AlCl_3$, $MgCl_2$, $ZnCl_2$, $FeCl_3$, $FeSO_4$, $RbOH$, $HCl$, $H_3PO_4$, $H_2SO_4$, $HNO_3$, $H_2O_2$, etc.; and heated (pyrolysis) in an inert atmosphere (Ar, $N_2$) at different temperature range 400-1200° C. The activation and the heat treatment (pyrolysis) under various gases can be done in a single step or in multiple steps. The surface area observed in these processes is in the range of 300-3000 $m^2/g$.

BRIEF DESCRIPTION OF THE DRAWINGS

The accompanying drawings, which are incorporated in and constitute a part of this specification, illustrate one (several) embodiment(s) of the invention and together with the description, serve to explain the principles of the embodiments described herein.

FIG. 1 is a flowchart of and representation of a process of preparing textile or plastic solid waste according to an embodiment disclosed herein.

FIG. 2B is a flowchart of and representation of a process of activation of an embodiment disclosed herein.

FIG. 2D is a flowchart of and representation of a process of optional preparation and activation of an embodiment disclosed herein.

FIG. 4 is a table showing experimental results using an embodiment disclosed herein and another embodiment known to the inventor.

DESCRIPTION OF EMBODIMENTS

Figure 2A:
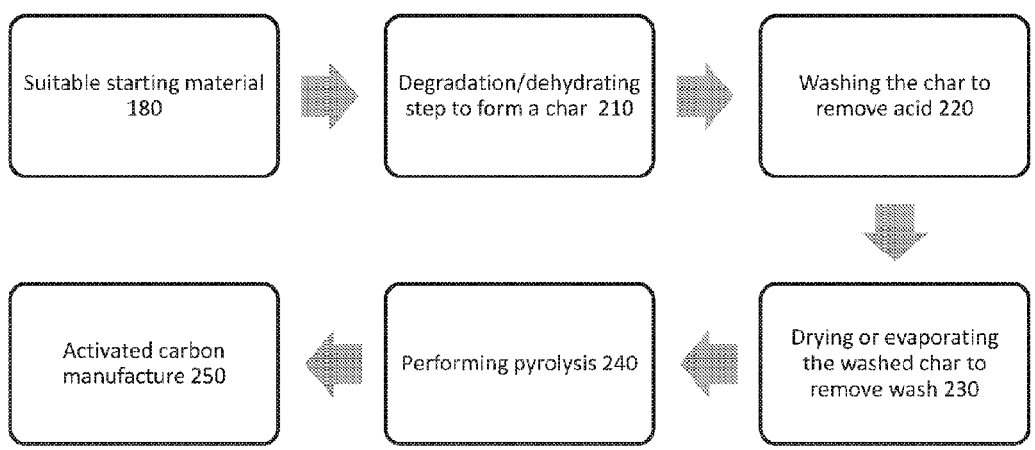
FIG. 2A is a flowchart of and representation of a process of activation of an embodiment disclosed herein.

Objects and advantages of the embodiments disclosed herein may be set forth in part in the description which follows, and in part may be obvious from the description, or may be learned by practice of the invention.

It is to be understood that both the foregoing general description and the following detailed description are exemplary and explanatory only and are not restrictive of the invention, as claimed.

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

The present description describes the use of textile solid and plastic waste, optionally without any virgin textile and plastic materials, to produce an activated carbon containing manufacture. The description also describes how to convert textile and plastic solid waste into a useful activated carbon containing manufacture that will eventually make it possible to reduce energy consumption and impact on air, water and land at local, national and global levels.

It is known to the inventor that textiles and plastic are used or consumed by business or individual consumers. At the end of their lives, most of the textiles and plastic are collected and either recycled or thrown away as waste.

With the increase in demand, the inventor sought to develop a new cost effective processes that makes it possible to reduce waste gases released during pyrolysis (such as hydrogen, methane, ethane, ethane, propane, propene, butane, butane, $CO_2$, CO, and HCl), and that uses one of the cheapest resources to produce carbon and activated carbon, which makes it possible to rely on less energy consumption and to replace fossil fuel as a starting material 180. Moreover, the present inventor has made it possible to prepare activated carbon with very specific characteristics, including high surface area and/or equal pore size distribution. The present method makes it possible to minimize gases produced during pyrolysis using a degradation/dehydrating step. For example, in some embodiments, a dehydration/degradation reaction is as follows for a solid textile or plastic waste comprising sugar: sugar+acid→carbon+water+acid (1). Reaction (1) makes it possible to minimize gases produced during pyrolysis using a degradation/dehydrating step with a complete or substantially complete conversion of organic carbon into elemental inorganic carbon.

The present disclosure describes how to convert textile and plastic solid waste into an activated carbon containing manufacture. The activated carbon containing manufacture is optionally derived from non-virgin (used or worked for at least a first time) natural or synthetic fibers, yarn, or fabric. In some embodiments, the obtained activated carbon containing manufacture has a form chosen from powders, sheets, foils, fibers, rectangular or circular structures/articles, pipes, armors, and any given form of simple or complex structures/articles comprising graphite, such as those described herein. In some embodiments, the process described herein makes it possible to ultimately reduce energy consumption and/or environmental pollution. In some embodiments, the process makes it possible to simply make a desired activated carbon containing manufacture.

Textile solid waste is readily available from sources such as recycling centers or municipal waste sites. In some embodiments, the textile solid waste has a form chosen from clothing (fabric), furniture, carpets, footwear, towels, sheets, etc.

The process described herein is not alchemy and does not purport to make an activated carbon containing manufacture from noncarbon containing textile or plastic solid waste. In other words, the term textile or plastic solid waste, as used herein, refers to textile or plastic solid waste comprising elemental carbon.

In some embodiments, the process includes three steps, namely, (1) an optional preparing process 100 of the textile or plastic solid waste; (2) an activation process 200; and (3) an optional post-activation process 300.

In some embodiments, textile solid waste comprises natural fiber, organic synthetic fiber, or a mixed type of fiber. In some embodiments, the textile solid waste comprises a natural fiber. In some embodiments, the textile solid waste comprises an organic synthetic fiber.

In some embodiments, the textile solid waste comprises both natural and organic synthetic fibers. In some embodiments, the natural fibers are independently chosen from those prepared from cottons, linens, jutes, wood pulp fibers, kapoks, silks, wools, and hairs. In some embodiments, the organic synthetic fibers are independently chosen from manmade fibers obtainable from organic precursors, such as acrylics, cellulosic polyvinyl alcohols, polyamides, polyimides, polyesters, polybenzimidazoles, cellulose thiourethanes, polyvinyl chlorides, cellulose acetates, etc. In some embodiments, the fibers are cellulosic, such as rayons, acetates, triacetates, and lyocells. In some embodiments, the fibers are non-cellulosic. Of course, textile solid waste, as used herein, is a broad term and is not restricted to the above mentioned precursors of fibers but also includes others precursors from which fibers, yarn, and/or fabric are fabricated.

In some embodiments, the textile solid waste has a form chosen from clothing (fabric), furniture, carpets, footwear, towels, sheets, etc. In some embodiments, the textile solid waste comprises natural fiber, organic synthetic fiber, or a mixed type of fiber. In some embodiments, the natural fibers are independently chosen from those prepared from cottons, linens, jutes, wood pulp fibers, kapoks, silks, wools, and hairs. In some embodiments, the organic synthetic fibers are independently chosen from manmade fibers obtainable from organic precursors, such as acrylics, cellulosic polyvinyl alcohols, polyamides, polyimides, polyesters, polybenzimidazoles, cellulose thiourethanes, polyvinyl chlorides, cellulose acetates, etc, In some embodiments, the fibers are cellulosic, such as rayons, acetates, triacetates, and lyocells, and in some embodiments, the fibers are non-cellulosic. Of course, textile solid waste, as used herein, is a broad term and is not restricted to the above mentioned precursors of fibers but also includes others precursors from which fibers, yarn, and/or fabric are fabricated.

In some embodiments, the plastic solid waste is a form chosen from containers and packaging (e.g., soft drink bottles, lids, shampoo bottles), durable goods (e.g., appliances, furniture), and nondurable goods (e.g., diapers, trash bags, cups and utensils, medical devices). In some embodiments, the containers and packaging are chosen from soft-drink bottles, lids, and shampoo bottles. In some embodiments, the durable goods are chosen from appliances and furniture. In some embodiments, the nondurable goods are chosen from diapers, trash bags, cups, utensils, and medical devices.

In some embodiments, the plastic solid waste is a form chosen from beverage containers, toys, and furniture.

In some embodiments, the plastic solid waste is from a source chosen from molded plastic articles, beverage bottles, water bottles, water cups, yogurt containers, juice and soft drink bottles, but are not limited to this type of plastic solid waste.

In some embodiments, the plastic solid waste is chosen from thermosets or thermoplastics. In some embodiments, the thermosets are chosen from inks, adhesives, and coatings. In some embodiments, the thermoplastics are chosen from molded products, such as milk jugs, floor coverings, credit cards, and carpet fibers.

In some embodiments, the plastic solid waste comprises, mainly, one or more polymers chosen from polyethylenes, polypropylenes, polystyrenes, polyethylene terephthalates, and polyvinyl chlorides.

In some embodiments, the plastic solid is chosen from PET—Polyethylene Terephthalate; HDPE—High-density Polyethylene; LDPE—Low-density Polyethylene; Vinyl—Poly Vinyl Chloride; PP—Polypropylene; PS—Polystyrene; and Other—Mixed Plastics. Many other plastics are used. In some embodiments, the plastics are chosen from acetals, acrylics, amino resins, cellulosics, phenolics, polyamids, polyesters, polyolefins, polyurethanes, styrens, and vinyls.

In some embodiments, the textile or plastic solid waste is a material that is used or consumed in an industrial scale or at an individual level. The materials after their uses are again recycled, and the recyclability depends on the quality of the materials after its use, and at the end of their lives have little or no economic value, mostly thrown as a waste that often creates disposal problem.

In some embodiments, both textile solid waste and plastic solid waste are used in activation process 200. In some embodiments, just textile solid waste is used in activation process 200. In some embodiments, just plastic solid waste is used in activation process 200.

From the present description, it is possible to achieve an industrial sustainable process in which the textile or plastic solid waste is either degradable or non-degradable waste. Either degradable or non-degradable waste makes it possible to efficiently convert the waste into useful products that can be integrated in various applications.

In some embodiments, the textile or plastic solid waste is collected and accumulated until a sufficient quantity is reached. In some embodiments, a sufficient quantity is from 5 to 1000 kg or from 25 to 100 kg or 40 to 85 kg. In some embodiments, a sufficient quantity is from 500 to 12,500 kg or from 2,500 to 10,000 kg or 4,000 to 8,500 kg.

Although the textile or plastic solid waste in any form is sufficient to proceed to make an activated carbon containing manufacture using the activation process 200, varying the quality of the carbon manufacture is obtainable by altering the form of the textile or plastic solid waste using one or any of the steps in the preparing process 100 below and in FIG. 1.

FIG. 1 is a flowchart of and representation of a process of preparing textile or plastic solid waste according to an embodiment. In some embodiments, the preparing process 100 involves successive steps, which are depicted in FIG. 1. In some embodiments, the preparing process 100 involves non-successive steps, which are depicted in FIG. 1. In some embodiments, the preparing process 100 involves skipping one or more steps, or an additional step to one or more steps which are depicted in FIG. 1. The product of any step of preparing process 100 is a suitable starting material 180 in the process of activation 200. Also, the preparing process 100 is overall optional.

In some embodiments, the textile or plastic solid waste is washed, in the washing the textile or plastic solid waste step 110, with water to remove dirt attached to the fabrics and thereafter is dried. In some embodiments, the water is tap water. In other embodiments, the water is purified by filtration, sedimentation, flocculation, disinfection, or combinations thereof, In some embodiments, water is recycled filter drainage water. In some embodiments, washing 110 includes detergent and/or bleaching agents. Typical detergents include laundry detergents. In some embodiments, the detergent is chosen from anionic, cationic or zwitterionic detergents. In some embodiments, washing 110 includes bleaching agents such as sodium hypochlorite. Drying could be done by "drip-dry" or heating in a drier suitable for the chosen quantity.

In some embodiments, the textile or plastic solid waste is stripped, in stripping the textile or plastic solid waste step 120, of non-carbon-containing or non-textile substances. In some embodiments, these substances include metal, wood, and/or undesirable plastics parts. In some embodiments, the wood is stripped by physical force. In some embodiments, the metal is removed (stripped) by chemical reaction/solvation and/or physical force. In some embodiments, the plastic is removed (stripped) by chemical reaction/solvation and/or physical force. Stripping step 120 makes it possible to remove foreign bodies which cannot be shredded or which cannot yield carbon or which are to be considered an impurity for activation process 200.

In some embodiments, the textile or plastic solid waste is separated, in separating step 130, by an observable property, such as nature of the fabric and/or Denier. Separating step 130, in some embodiments, makes it possible to separate the chemical type of material.

In some embodiments, in separating step 130, the textile or plastic solid waste is separated by the nature of the textile or plastic itself. For example, the fabric of the textile solid waste, as noted herein, can comprise natural fiber, organic synthetic fiber, or a mixed type of fiber, and the textile solid waste is separable into one or more sets, e.g., comprising natural fiber or organic synthetic fiber, etc. In some embodiments, the separating is achieved by hand with or without the aid of spectral and/or chemical analysis.

As noted above, separating step 130 is optional and mixing textile solid waste (optionally having one or more subtypes) is envisioned.

In some embodiments, in separating step 130, the textile or plastic solid waste is separated using a resin identification coding system, such as that used in separating plastics by an ASTM identification code (2010) chosen from 1-7, i.e., PET, HDPE, Vinyl, LDPE, PP, PS, and Other, respectively. As noted above, separating step 130 is optional and mixing plastic (optionally having one or more subtypes, PET, HDPE, Vinyl, etc.) is envisioned.

Also, as noted above, separating step 130 is optional and mixing plastic (optionally having one or more subtypes) and textile solid waste (optionally having one or more subtypes) is envisioned.

In some embodiments, the textile or plastic solid waste is cut, in cutting step 140, into a desired shape of a structure or article, such as a rectangle, square, or circle of particular dimension. In general, cutting is not restricted to producing a particular shape and any given shape (rectangular, square, circular, and the like). Any other form is envisioned. In some embodiments, the cutting 140 is achieved by a cutting tool having one or more blades sufficient to produce fibrous sheds, fabric dust, and cut pieces of fabric. In some embodiments, cutting 140 produces primarily cut pieces of fabric or plastic. The cut pieces of fabric or plastic are a suitable starting material 180 in the process of activation 200 to obtain an activated carbon containing manufacture, such as a foil, a sheet or other article, such as those described herein.

In some embodiments, the textile or plastic solid waste, optionally having a form of cut pieces of fabric, is shredded, in shredding step 160, to obtain open length fibers, optionally having a substantially uniform length. In some embodiments, the shredding 160 is achieved by a commercial fabric shredder. In some embodiments, the substantial uniform length is noticeable by a sample of open fibers having a length distribution of +0 to 2 standard deviations (assuming a normal distribution). In this case, the sample of open fibers appears substantially uniform in length to an observer. In some embodiments, the result is primarily a fibrous shred of open fibers and fabric dust. In some embodiments, the fibrous shred of open fibers is a suitable starting material 180 in the process of activation 200 to obtain an activated carbon manufacture, such as those described herein. In some embodiments, shredding 160 makes a shredded product optionally sized from a millimeter to 3 centimeters or even greater. Such optionally sized shredded products are suitable for milling and mesh screening (filtering 170 below). In some embodiments, and as explained below, the carbon fiber or graphite fibers useable to help to increase the conductivity in the active material (following activation process 200), e.g., in the making of an electrode optionally chosen from supercapacitors and pseudocapacitors.

In some embodiments, the fabric dust is a suitable starting material 180 in the process of activation 200 to obtain an activated carbon manufacture, such as grains or powders or other articles, such as those described herein.

In some embodiments the suitable starting material 180 is or comprises textile and/or plastic solid waste having an average size ranging from 0.001 to 5 mm or 0.002 to 5 mm. In some embodiments, the average size ranges from 0.001 to 0.3 mm or from 0.003 to 0.05 mm or from 0.003 to 0.008 mm. In some embodiments, the standard deviation length of the component parts of the suitable starting material 180 has a value ranging from +5% to +10% of the average size such that the suitable starting material 180 appears to have a substantially uniform size to an ordinary observer.

In some embodiments, the open fibers and fabric dust are separated, in filtering step 170, before the activation process 200. In some embodiments, the removal is achieved by mesh filtration capturing the textile solid waste, e.g., in raw form or in the form of cut pieces and/or open fibers, but passing the fabric dust.

As apparent herein, in some embodiments, the textile solid waste is free from a virgin textile material, and the plastic solid waste is free from a virgin plastic material.

In some embodiments, one may want to form a composite material structure form of the activated carbon containing manufacture. In such embodiments, a composite forming additive is added to the textile and plastic solid waste 180. Although adding a composite forming additive 180 is shown before activation process 200, in some embodiments, composite forming additive is added during or after activation process 200. In some embodiments, the composite forming additive is chosen from metals, metal oxides, carbon nanotubes, graphite fibers, and carbon fibers.

Activation Step

FIG. 2A is a flowchart of and representation of a process of activation 200 of an embodiment disclosed herein. The process of activation 200 includes degradation/dehydrating step 210, washing 220, drying or evaporating 230, and performing pyrolysis 240. In some embodiment, the process of activation 200 includes degradation/dehydrating step 210 and performing pyrolysis 240, and either washing 220 or drying or evaporating 230 or both are skipped.

In some embodiments, the char of the degradation/dehydration 210 is used to make a graphite or graphene material manufacture. In some embodiments, the char of the degradation/dehydration 210 is converted to graphite by graphitising, i.e., heat-treating the char at a temperature ranging from 2600° C. to 3300° C. In some embodiments, the graphene is made from exfoliation of graphite made using the char of the degradation/dehydration 210, sodium ethoxide pyrolysis of the char of the degradation/dehydration 210, reduction of graphite oxide prepared using the char of the degradation/dehydration 210, etc.

Although below the steps are described as performed on the textile or plastic solid waste (which is itself a suitable starting material 180), the process of activation 200 is performable on a suitable starting material 180 that is the result of one or more steps such as those shown in FIG. 1.

In some embodiments, the degradation/dehydrating step 210 is an initial step. In this dehydration step 210 the textile solid waste and the plastic solid waste undergoes hydrolysis when mixed with an acid sufficiently strong to induce hydrolysis. This step accelerates the removal of —OH groups as water and the formation of double bonds or ring structure takes place to produce carbon, which also provides active carbon or composites thereof.

In some embodiments, the acid sufficiently strong to induce hydrolysis is chosen from strong acids (pKa<−1.74). In some embodiments, the strong acid is chosen from sulfuric acid $H_2SO_4$. In some embodiments, the acid includes or is sulfuric acid.

In some embodiments, the degradation/dehydration process 210 of the textile or plastic solid waste can be initiated with and without external heating. In some embodiments, the maximum temperature that can be reached in this step is below 200° C., e.g., about 180° C. In some embodiments, the temperature during the degradation/dehydrating step 210 ranges from 140 to 210° C. or from 170 to 190° C. In some embodiments, the degradation/dehydrating step 210 is carried without adding external heat as the reaction is exothermic to produce carbon without any greenhouse gas emission. In some embodiments, heat is removed from the system in which degradation/dehydrating step 210 is carried.

In some embodiments, the degradation/dehydrating step 210 is conducted for a period of time sufficient to provide activated carbon or composites thereof. In some embodiments, the time is from 1 hour to 7 hours or from 2 to 5 hours or from 3 to 4 hours.

In some embodiments, the degradation/dehydrating process 210 of the textile and plastic solid waste is carried under agitation. For example, agitation is, in some embodiments, chosen from mechanical stirring.

In some embodiments, the degradation/dehydrating step 210 is carried out under negative pressure, in a closed container. In some embodiments, the degradation/dehydrating step 210 is carried out under positive pressure, such as a closed system.

In some embodiments, the degradation/dehydrating step 210 is carried out in an air atmosphere or an inert gas atmosphere.

In some embodiment, the degradation/dehydrating step 210 is carried out in an inert atmosphere under pressure 1 bar to 10 bar, and at 150-600° C.

In some embodiments, the degradation/dehydrating step 210 of the textile or plastic solid waste material in acid undergoes exothermic dehydration, polymerization and aromatization reactions at lower temperature and this process leads to high carbon yield and the aromatization of the carbon skeleton results into porous structure.

In some embodiments, the product of the degradation/dehydrating step 210 is subjected to washing 220. Washing 220 depends on acid used in the degradation/dehydrating step 210. In some embodiments, washing is performed with water.

In some embodiments, the washing 220 is rinsing, flushing, or flooding the system in which the degradation/dehydrating 210 reaction step is carried out. In some embodiments, the washing is accompanied by agitation, such as the agitation noted herein above.

In some embodiments, the product of the washing 220 is subjected to drying or evaporating 230. The drying is done at elevated temperature, such as 90 to 400° C. or 150 to 200° C. In some embodiments, the drying is performed at an elevated or reduced pressure, such as 350 to 1,200 torr or 650 to 1,000 torr. In some embodiments, drying occurs at an elevated temperature and reduced pressure or at elevated temperature and an elevated pressure.

In some embodiments, the degradation/dehydration step 210 product (optionally washed per step 220 and dried or evaporated per step 230), i.e., the carbon that is produced, is subjected to pyrolysis 240 by directly heating at a temperature ranging from 300 to 1,300° C. In some embodiments, the temperature is chosen from 400° C., 500° C., 600° C., 700° C., 800° C., 900° C., 1,000° C., 1,100° C., and 1,200° C., to produce activated carbon or composite thereof. In some embodiments, this pyrolysis step 240 is performed for a period of time sufficient to maximize the yield of activated carbon or a composite thereof. In some embodiments, the time is from 1 hour to 10 hours or from 2 to 7 hours or from 3 to 5 hours. Pyrolysis, in some embodiments, is performed in a rotary kiln.

In some embodiments, the pyrolysis is performed at an elevated or reduced pressure, such as 350 to 1,200 torr or 650 to 1,000 torr.

In some embodiments, the pyrolysis is performed under air or an inert gas atmosphere (such as Ar, or $N_2$). In some embodiments, pyrolysis is performed under an atmosphere of flowing $N_2$ gas.

As apparent herein, in some embodiments, the activation process 200 is free from catalyst.

Performing degradation/dehydrating 210 makes it possible to minimize gases produced during performing pyrolysis 240.

In some embodiments, one or more suitable chemical activation agents are added to the carbon or composite thereof before pyrolysis 240. For example, in some embodiments, the one or more suitable chemical activation agents are added after degradation/dehydrating step 210, during degradation/dehydrating step 210, during washing 220 or during drying 230. In some embodiments, the one or more suitable chemical activation agents are chosen from LiOH, $H_3BO_3$, NaOH, $Na_2CO_3$, $Na_2S_2O_3$, $Na_2S$, KOH, KCl, $K_2CO_3$, $CaCl_2$, $P_2O_5$, CsOH, $AlCl_3$, $MgCl_2$, $ZnCl_2$, $FeCl_3$, $FeSO_4$, RbOH, HCl, $H_3PO_4$, $H_2SO_4$, $HNO_3$, $H_2O_2$, and the like. In some embodiments, the one or more suitable chemical activation agents are chosen from $H_2SO_4$, $H_3PO_4$, KOH, NaOH, and $ZnCl_2$. The degradation/dehydration step 210 by itself is a activation process. In some embodiments, by adding a chemical activation agent, it is possible to improve the activation as the chemical activation agents intercalate into the carbon structure and thereafter washing 220 the chemicals (e.g., Na, K, Zn, Fe, and the like) are dissolved, e.g., in a washing liquid or removed by washing 220, and the result leads to a porous or pore structure in the carbon material.

In some embodiments, one or more suitable physical activation agents (e.g., steam, $CO_2$, dry air and the like) in the form of a gas are passed in the pyrolysis chamber on the carbon or composite thereof during pyrolysis. In some embodiments, the one or more suitable physical activation agents are chosen from steam ($H_2O$ (g)), CO, dry air and $CO_2$ gases. In some embodiments, both steam ($H_2O$ (g)) and $CO_2$ are used.

In some embodiments, both one or more chemical activation agents and one or more physical activation agents are added or operated under gas flow during pyrolysis 240.

The resultant activated carbon manufacture 250 or composite thereof (see below) is usable as-is or suitable for an optional post-activation process 300.

FIG. 2B is a flowchart of and representation of a process of activation 200 of an embodiment disclosed herein. In some embodiments, suitable starting material 180, such as textile or plastic solid waste, is subjected to pyrolysis 240 as noted above. And physical or chemical activation 270 is performed as noted herein above.

The resultant activated carbon manufacture 250 or composite thereof (see below) is usable as-is or suitable for an optional post-activation process 300.

In some embodiments, activated carbon manufacture 250 has the form of a composite material structure obtained by adding a composite forming additive chosen from at least one metal element, metal oxide thereof, or a precursor thereof to the textile or plastic solid waste to produce a metal/metal oxide activated carbon matrix. In some embodiments, the composite forming additives are added after or in situ with performing pyrolysis 240. In some embodiments, the composite forming additive further includes one or more other composite additives noted herein, such as the carbon fibers and/or graphite fiber or CNT noted below. In some embodiments, the at least one other element or metal oxides thereof is chosen from Ag, Au, Pt, Pd, Ru, Rh, Ir, Sr, Ce, Ti, Zr, V, Nb, Cr, Mo, Mn, Fe, Co, Ni, Cu, Zn, Si, Sn, Pb, Sb, Nb, Bi, Hf, Ba, W, Mg, Al, B, P, and Li or metal oxides thereof. In some embodiments, the precursor is chosen from salts of the at least one other element, e.g., metal sulfates, organometallic compounds, coordination inorganic compounds, metal salts mostly or any combination thereof. In some embodiments, the at least one element, metal oxide thereof, or precursor thereof is in the form of a micron or nanostructured element. In some embodiments, the transition metal compounds are chosen from cobalt sulfate, iron sulfate, nickel sulfate, molybdenum sulfate, copper sulfate, and tungsten chloride, hydrogen hexacloroplatinate hydrate, zirconium chloride, cerium nitrate, ruthenium chloride, hafnium chloride. The metal/metal oxide present in the carbon matrix is in the amount from 0.01% to 70% by weight of the metal/metal oxide plus carbon matrix. In some embodiments, the amount ranging from 1 to 30% by weight of the metal/metal oxide plus carbon matrix or from 30 to 70% by weight of the metal/metal oxide plus carbon matrix or from 10 to 70% by weight of the metal/metal oxide plus carbon matrix.

In some embodiments, the at least one metal element, metal oxide thereof, or a precursor thereof is introduced during one or more of the processing steps 110-140 or 160-170. For example, in some embodiments, the at least one metal element, metal oxide thereof, or a precursor thereof is introduced after pyrolysis step 240 or after activation step 270.

In some embodiments, the at least one metal element, metal oxide thereof, or a precursor thereof comprises a nanoparticle or micronparticle. In some embodiments, the nanoparticles have diameters ranging from 2 nm to 10,000 nm, or in other embodiments, from 30 nm to 800 nm or from 100 nm to 500 nm. In some embodiments, the nanoparticles have diameters ranging from 1,000 nm to 9,000 nm, or in other embodiments, from 3,000 nm to 8,000 nm. In some embodiments, the nano- or micron-particles are metal oxide nanoparticles comprising oxides of iron, ruthenium, osmium, cobalt, rhodium, iridium, nickel, palladium, platinum or combinations thereof. In some embodiments, the metal oxide nanoparticles comprise nickel oxide.

In some embodiments, the metal-containing material comprises an organometallic metal oxide precursor or a mixture of such precursors. In some embodiments, the metal oxide precursor comprises a metal acetylacetonate. In some embodiments, the metal oxide precursor comprises nickel acetylacetonate. In some embodiments, the metal oxide precursor comprises metal acetate with an alcohol as a solvent. In some embodiments, the precursor is nickel acetate.

In some embodiments, the at least one metal element, metal oxide thereof, or a precursor thereof is chosen from organometallic metal oxide precursor (e.g., nickel acetylacetonate), a mixture of such precursors or a mixture of such precursors and one or more metal oxide nanoparticles, is used, the organometallic precursors may be converted to metal oxides of suitable particulate size during the activation step 200.

In some embodiments, the metal/metal oxide carbon matrix has from 30 to 70% by weight of the metal/metal oxide plus carbon matrix. In some embodiments, the metal/metal oxide carbon matric is chosen from Pb/PbO+activated carbon, for lead acid battery and ultrabattery applications.

Figure 2C:
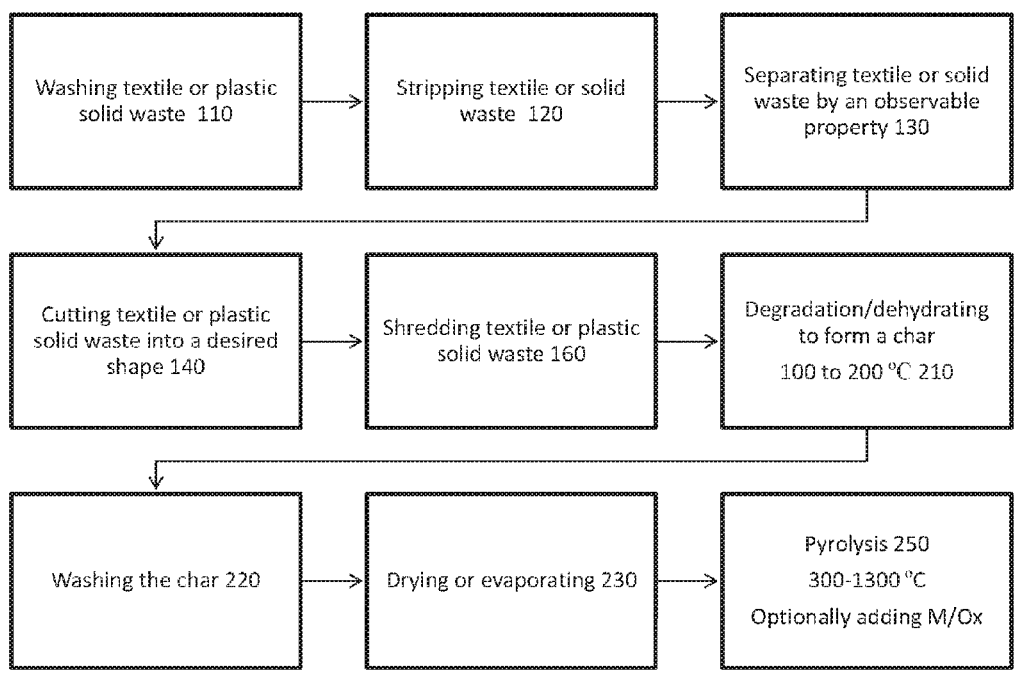
FIG. 2C is a flowchart of and representation of a process of optional preparation and activation of an embodiment disclosed herein.

For example, FIG. 2C is a flowchart of and representation of a process of optional preparation 100 and activation 200 of an embodiment disclosed herein. Textile or plastic solid waste is washed 110, stripped 120, separated 130, cut 140, and shredded 160 before being subject to dehydration/degradation 210 with concentrated sulfuric acid. After washing 220 and drying/evaporating 230, pyrolysis 250, e.g., in an rotary kiln, is performed. In some embodiments, pyrolysis 250 is performed in the presence of at least one metal element, metal oxide thereof, or a precursor thereof (M/MOx). In some embodiments, the resultant composite is useable for pseudocapacitor applications. After decomposition of, e.g., metal organic salts, any the organic part will generate carbon and metal is either reduced in the condition or oxidized, e.g., in the steam or dry air environment or inert atmosphere.

For example, FIG. 2D is a flowchart of and representation of a process of optional preparation 100 and activation 200 of an embodiment disclosed herein. Textile or plastic solid waste is washed 110, stripped 120, separated 130, cut 140, and shredded 160 before being subject to pyrolysis 250 at a temperature ranging from 300 to 1,300° C. Physical or chemical activation 270 is performed, and in some embodiments, the at least one metal element, metal oxide thereof, or a precursor thereof is present in the physical/chemical activation 270. In some embodiments, the resultant composite is useable for pseudocapacitor applications. After decomposition of, e.g., metal organic salts, any the organic part will generate carbon and metal is either reduced in the condition or oxidized, e.g., in the steam or dry air environment or inert atmosphere.

In some embodiments, the activated carbon manufacture 250 is in the form of a composite material structure obtained by adding a composite forming additive chosen from carbon nanotubes (CNTs) to the suitable starting material 180 to produce a CNT activated carbon matrix. In some embodiments, the CNTs are added during degradation/dehydration step 210 (vide infra). In this case, the elemental carbon produced in degradation/dehydration step 210 is attachable to the CNTs and it is possible for the CNTs to be more uniformly dispersed in the resultant composite of activation process 200. The CNTs usable to produce activated carbon matrix can be in the form of single walled carbon nanotubes (SWCNTs), double walled carbon nanotubes (DWCNTs), few walled carbon nanotubes (FWCNTs), multiwalled carbon nanotubes (MWCNTs), each may be functionalized or bare CNTs in the carbon matrix. In some embodiments, the CNTs have an aspect ratio ranging from 5 to 1,000,000 or from 10 to 100,000 or from 100 to 10,000. CNTs are commercially available or makeable by known methods. The CNTs are present in an amount ranging from 0.05 to 20% by weight of the CNTs and the textile of plastic solid waste. In some embodiments, the amount ranging from 0.001% to 20% by weight of the CNTs and the textile of plastic solid waste or from 0.08% to 15% by weight of the CNTs and the textile of plastic solid waste or from 0.1 to 5% by weight of the CNTs and the textile of plastic solid waste. In some embodiments, e.g., the weight percentage is from 0.01% to 2%.

Figure 2E:
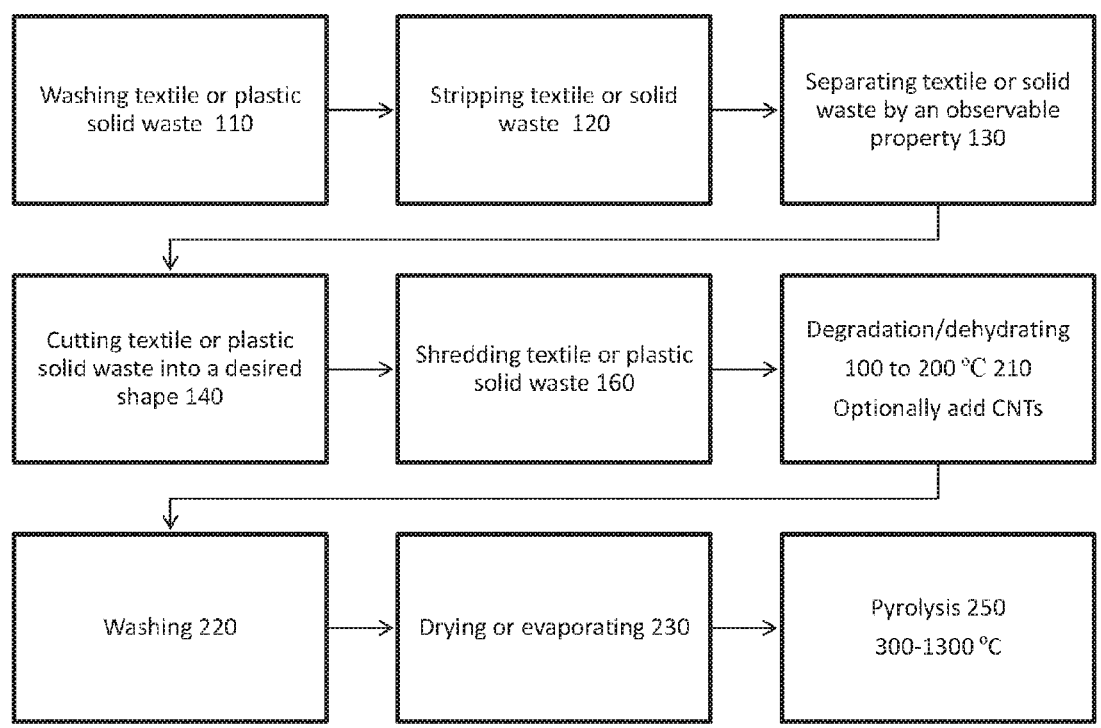
FIG. 2E is a flowchart of and representation of a process of optional preparation and activation of an embodiment disclosed herein.

For example, FIG. 2E is a flowchart of and representation of a process of optional preparation 100 and activation 200 of an embodiment disclosed herein. Textile or plastic solid waste is washed 110, stripped 120, separated 130, cut 140, and shredded 160 before being subject to dehydration/degradation 210 with concentrated sulfuric acid. After washing 220 and drying/evaporating 230, pyrolysis 250 is performed. In some embodiments, the CNTs are added during the degradation/dehydrating 210.

In some embodiments, the activated carbon manufacture 250 is in the form of a composite material structure obtained by adding a composite forming additive chosen from either graphite fibers or carbon fibers (or both) to the suitable starting material 180 to produce a graphite/carbon-fiber activated carbon matrix. In some embodiments, the composite forming additive is added after degradation/dehydrating step 210 (vide infra), and optionally in a rotary kiln to facilitate dispersing the composite forming additive. Graphite fibers or carbon fibers are commercially available or makeable by known methods. In some embodiments, the graphite fibers or carbon fibers have a length ranging from 0.1 to 10 cm or from 0.2 to 2 cm or from 0.5 to 1 cm. The graphite/carbon fibers are present in an amount ranging from 0.01 to 30% by weight of the graphite/carbon fibers and carbon matrix. In some embodiments, the amount ranging from 0.05 to 25% by weight or from 1 to 20% by weight of the graphite/carbon fibers and carbon matrix.

Figure 2F:
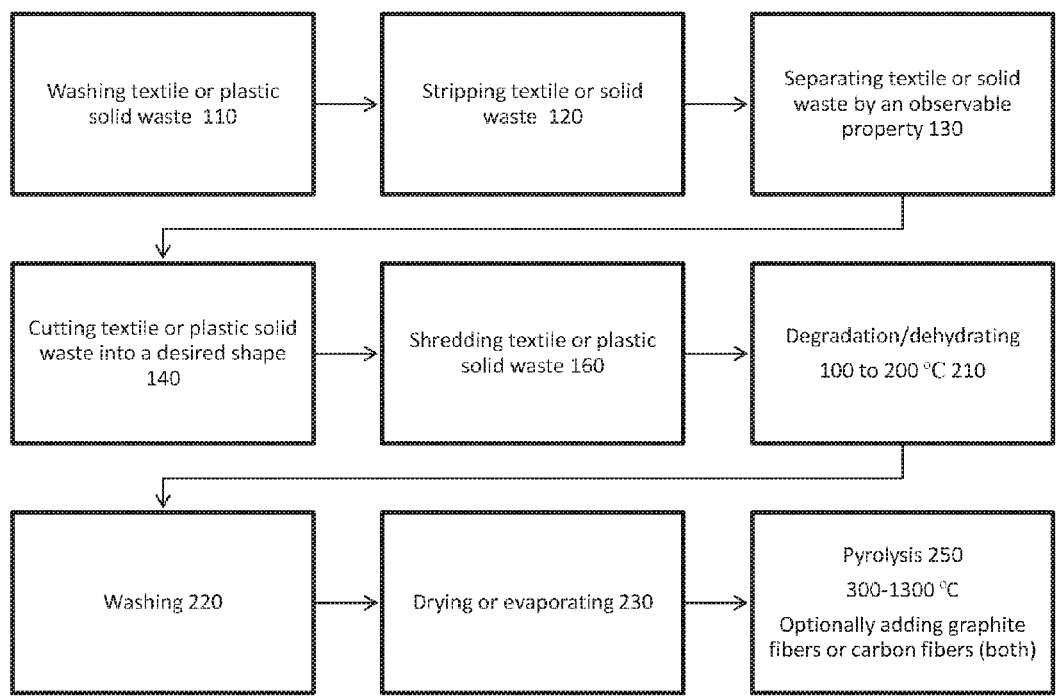
FIG. 2F is a flowchart of and representation of a process of optional preparation and activation of an embodiment disclosed herein.

For example, FIG. 2F is a flowchart of and representation of a process of optional preparation 100 and activation 200 of an embodiment disclosed herein. Textile or plastic solid waste is washed 110, stripped 120, separated 130, cut 140, and shredded 160 before being subject to dehydration/degradation 210 with concentrated sulfuric acid. After washing 220 and drying/evaporating 230, pyrolysis 250, e.g., in a rotary kiln, is performed in the presence of either graphite fibers or carbon fibers (or both).

Figure 2G:
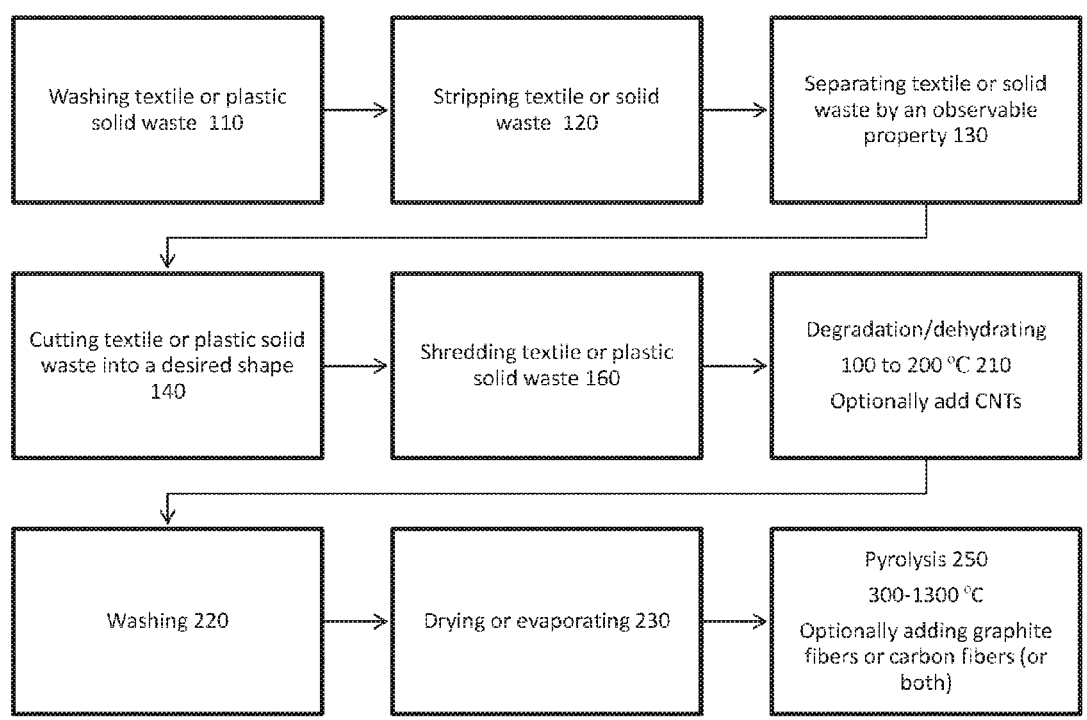
FIG. 2G is a flowchart of and representation of a process of optional preparation and activation of an embodiment disclosed herein.
Figure 3:
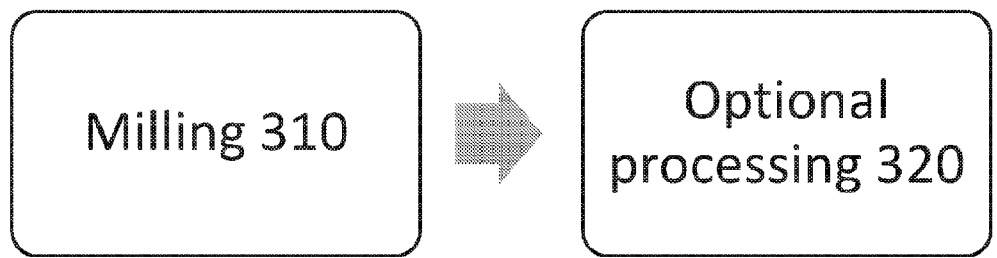
FIG. 3 is a flowchart of and representation of a post-activation process of an embodiment disclosed herein.

For example, FIG. 2G is a flowchart of and representation of a process of optional preparation 100 and activation 200 of an embodiment disclosed herein. Textile or plastic solid waste is washed 110, stripped 120, separated 130, cut 140, and shredded 160 before being subject to dehydration/degradation 210 with concentrated sulfuric acid. The CNTs are added during the degradation/dehydrating 210. After washing 220 and drying/evaporating 230, pyrolysis 250, e.g., in a rotary kiln, is performed in the presence of either graphite fibers or carbon fibers (or both). In some embodiments, during degradation/dehydration there is formation of elemental carbon, the elemental carbon is found on a nucleation site on the CNTs, and the elemental carbon accumulates on the CNTs.

The resultant activated carbon or composite thereof 250 have pores and surface area (measured using density functional theory DFT).

In some embodiments, at least about 40% of the total number of pores have a size ranging from about 2 to about 50 nm. In some embodiments, at least about 50% of the total number of pores have a size ranging from about 2 to about 50 nm. In some embodiments, at least about 60% of the total number of pores have a size ranging from about 2 to about 50 nm. In some embodiments, at least about 70% of the total number of pores have a size ranging from about 2 to about 50 nm. In some embodiments, not more than about 35% of the total number of pores have a size larger than about 50 nm. In some embodiments, not more than about 25% of the total number of pores have a size larger than about 50 nm. In some embodiments, not more than about 20% of the total number of pores have a size larger than about 50 nm. In some embodiments, not more than about 15% of the total number of pores have a size larger than about 50 nm.

In some embodiments, at least about 40% of the total number of pores have a size ranging from about 2 to about 35 nm. In some embodiments, at least about 50% of the total number of pores have a size ranging from about 2 to about 35 nm. In some embodiments, at least about 60% of the total number of pores have a size ranging from about 2 to about 35 nm. In some embodiments, at least about 70% of the total number of pores have a size ranging from about 2 to about 35 nm. In some embodiments, not more than about 35% of the total number of pores have a size larger than about 35 nm. In some embodiments, not more than about 25% of the total number of pores have a size larger than about 35 nm. In some embodiments, not more than about 20% of the total number of pores have a size larger than about 35 nm. In some embodiments, not more than about 15% of the total number of pores have a size larger than about 35 nm.

In some embodiments, at least about 40% of the total number of pores have a size ranging from about 3 to about 25 nm. In some embodiments, at least about 50% of the total number of pores have a size ranging from about 3 to about 25 nm. In some embodiments, at least about 60% of the total number of pores have a size ranging from about 3 to about 25 nm. In some embodiments, at least about 70% of the total number of pores have a size ranging from about 3 to about 25 nm. In some embodiments, not more than about 35% of the total number of pores have a size larger than about 25 nm. In some embodiments, not more than about 25% of the total number of pores have a size larger than about 25 nm. In some embodiments, not more than about 20% of the total number of pores have a size larger than about 25 nm. In some embodiments, not more than about 15% of the total number of pores have a size larger than about 25 nm.

In some embodiments, the resultant activated carbon and composite thereof have a surface area ranging from 900 to 3,000 $m^2/g$. In some embodiments, the resultant activated carbon and composite thereof have a surface area ranging from 1,000 to 2,400 $m^2/g$. In some embodiments, the resultant activated carbon and composite thereof have a surface area ranging from 1,300 to 2,000 $m^2/g$.

In some embodiments, the resultant activated carbon and composite thereof have a pore volume ranging from 0.400 to 0.900 cc/g. In some embodiments, the resultant activated carbon and composite thereof have a pore volume ranging from 0.500 to 0.800 cc/g. In some embodiments, the resultant activated carbon and composite thereof have a pore volume ranging from 0.600 to 0.700 cc/g.

In some embodiments, the resultant activated carbon and composite materials are grind milled to get the desired size range 3-50 micron, and then mesh screened to get 3-8 micron.

Activated carbon and composites thereof may be incorporated into all manner of devices that incorporate conventional activated carbon materials or that could advantageously be modified to incorporate activated carbon materials. Representative devices include but are not limited to all manner of electrochemical devices (e.g., capacitors; batteries, including but not limited to one side of a nickel hydride battery cell and/or both sides of a lithium ion battery cells; fuel cells, and the like). Such devices may be used without restriction in all manner of applications, including but not limited to those that potentially could benefit from high energy and high power density capacitors or the like. By way of illustration, devices containing activated carbon fibers embodying features of the present invention may be included in all manner of vehicles (e.g., as elements in capacitors and/or batteries, or electrical combinations thereof, which may optionally be coupled to one or more additional components including but not limited to capacitors, batteries, fuel cells or the like); electronic devices (e.g., computers, mobile phones, personal digital assistants, electronic games, and the like); any device for which a combination of battery and capacitor features is desirable (combining the energy density of batteries with the power densities of capacitors) including an uninterrupted power supply (UPS) in order to accommodate power surges and power failure ride-throughs, cordless drills, and the like; any device that may advantageously contain a conventional batcap (i.e., a system of devices that provide a capacitor for handling power density and a battery for providing energy density, wired in parallel); and the like. In some embodiments, a device embodying features of the present invention comprises a capacitor used in a vehicle, including but not limited to an electric vehicle and hybrids thereof. Representative vehicles for use in accordance with the present invention include but are not limited to automobiles, motorcycles, scooters, boats, airplanes, helicopters, blimps, space craft, and the like.

In some embodiments, the resultant activated carbon is subjected to one or more post-activation processing steps, including milling 310.

In some embodiments, the resultant activated carbon or composite thereof are milled 310. In some embodiments, the milling 310 is performed with a milling device or chemical milling. For example, a milling device is a Noll Gmbh's MaxxMill agitated media mill with an optional advanced air classifier. Chemical milling, for example using differentially potent catalysts in chosen proportions during activation could also produce powders. In some embodiments, milling 310 further includes sieving/screening/further classifying to control final aspect ratio distributions of the powder, or to eliminate fines.

As noted above, in some embodiments, the resultant activated carbon and composite materials are grind milled to get the desired average particle size ranging from 3 to 50 μm. In some embodiments, the grind milled product is mesh screened to get a particle size ranging from 3 to 8 μm. These steps are performed, in some embodiments, after the last step in FIGS. 2A-2G.

In some embodiments, optional processing 320 is performed. In some embodiments, electrodes are made. For example, an electrode is fabricated by dissolving an optional binder in a solvent or dispersing the optional binder in a dispersion medium with the resultant activated carbon or composite thereof to form a composition, and applying the slurry to a collector. Application is sometimes facilitated by a doctor blade or coating machine. After application, the solvent or the dispersion medium is removed by drying, leaving behind the binder and resultant activated carbon or composite thereof to the collector.

In some embodiments, the resultant activated carbon or composite thereof are shaped. In some embodiments, shaped carbon bodies are generally produced from powdered activated carbon particles with organic or inorganic binders. Carbon powder, binder, water, and other suitable ingredients are mixed to form a material that is subsequently shaped. The shaped bodies of wet carbon/binder mixture must be thermally treated at high temperatures to increase product strength and water stability. In some embodiments, the binder is chosen from clays and phenolic resin polymers. In some embodiments, the clay is a bentonite clay as a binder.

Different types of shaped carbon bodies have been demonstrated. In some embodiments, the shapes are chosen from granules, cylindrical pellets, spheres, sheets, ribbons, trilobes, and honeycombs.

In some embodiments, the resultant activated carbon or composite thereof is made into an electrode. In some embodiments, making an electrode comprises two stages: first, a conductor carbon (graphite) is placed onto a current collector foil via a slurry with binder and either dried or cured; second, a second coat of the activated carbon powder is then placed over the first coat, possibly with some conductor carbon blended.

In some embodiments, the electrode is suitable for use in a capacitor or another electrochemical device, comprises a current collector foil, covered with activated carbon or a composite thereof in electrical contact with the current collector. In some embodiments, the activated carbon or composite thereof is "mesoporous," which refers to activated carbon or a composite thereof having at least 50% of pores between 2 nm and 50 nm.

In some embodiments, an EDLC electrode is made of activated carbon bonded directly or indirectly onto a metal foil current collector, although metal oxides can be used. In some embodiments, the activated carbon or composite thereof is applied to current collectors together with additional metal oxides or the like for hybrid characteristics including enhanced pseudocapacitance.

In some embodiments, the capacitor further comprises an electrolyte, which in some embodiments is aqueous, in other embodiments is organic. In some embodiments, the capacitor exhibits electric double layer capacitance. In some embodiments, particularly when residual metal oxide is present on the surface of the activated carbon fibrous material, the capacitor further exhibits pseudocapacitance.

In some embodiments, a carbon EDLCs with organic electrolytes chosen from propylene carbonate, ethers, such as diethyl ether (DEE), tetrahydrofuran (THF), 1-3 dioxolane; esters, such as methyl formate (MF), γ-BL (Gama-Butyrolactone), alkyl carbonates, such as ethylene carbonate (EC), dimethyl carbonate (DMC), ethyl methyl carbonate (EMC), nitriles, such as acetonitrile; organic solvents and a standard fluoroborate salt or lithium salts. Some carbon and most commercial metal oxide EDLCs use aqueous electrolytes based on sulfuric acid ($H_2SO_4$) or potassium hydroxide (KOH). Any of these electrolytes or the like may be used in accordance with the present invention.

In some embodiments, electric double layer capacitor (EDLC) electrodes are prepared from the activated carbon obtained from the activation step. In some embodiments, the EDLC electrodes are prepared by mixing the activated carbon powder, carbon black as an electrical conductor and polytetrafluoroethylene (PTFE) as a binder in a mass ratio of 80:10:10 along with a solvent, such as N-methyl-2-pyrrolidone, to prepare a film structure. The electrode is testable for the EDLC performance.

In some embodiments, a conductive ink with high resistance is prepared from the activated carbon obtained from the activation step. In some embodiments, a polymeric binder, a liquid vehicle, and the carbon are mixed together by any conventional mixing to obtain a homogeneous mixture. The resistance obtained is in the range of mega ohms.

By way of example, the following embodiments are envisioned. In some embodiments, there is a method of converting textile solid waste and plastic solid waste into an activated carbon manufacture, comprising subjecting textile solid waste and plastic solid waste to a chemical and physical activation process under a pyrolysis system and a set of conditions in which pyrolysis is done at a temperature ranging from 400° C. to 1200° C. and in which at least one other conditions is chosen from (a) pyrolysis in inert atmosphere $N_2$; (b) pyrolysis in inert atmosphere $N_2$, along with steam; and (c) pyrolysis in inert atmosphere $N_2$, along with $CO_2$ flow. In some embodiments, the textile solid waste has a form chosen from clothing, furniture, carpets, footwear, towels, and sheets. In some embodiments, the textile solid waste comprises both natural and organic synthetic fibers. In some embodiments, the textile solid waste comprises at least one natural fiber chosen from fibers prepared from cottons, linens, jutes, wood pulp fibers, kapoks, silks, wools, and hairs. In some embodiments, the textile solid waste comprises at least one organic synthetic fiber chosen from acrylics, cellulosic polyvinyl alcohols, polyamides, polyimides, polyesters, polybenzimidazoles, cellulose thiourethanes, polyvinyl chlorides, and cellulose acetates. In some embodiments, the textile solid waste comprises at least one cellulosic fiber chosen from rayons, acetates, triacetates, and lyocells. In some embodiments, the textile solid waste is free from a virgin textile material. In some embodiments, the plastic solid waste has a form chosen from water bottles, water cups, yogurt container, juice and soft drink bottles. In some embodiments, the plastic solid waste comprises plastic bottles made up of polymers such as polyethylene, polypropylene, polystyrene, polyethylene terephthalate and polyvinyl chloride. In some embodiments, the activated carbon manufacture is in the form of a composite material structure obtained by adding at least one other element or a precursor thereof to the textile solid waste/plastic solid waste during the char formation. For example, the at least one other element is chosen from graphitic fibers, carbon fibers, CNTs, metals and metal oxides. For example, the CNTs are chosen from one of the form of single walled carbon nanotubes (SWCNTs), double walled carbon nanotubes (DWCNTs), few walled carbon nanotubes (FWCNTs), multiwalled carbon nanotubes (MWCNTs), each may be functionalized or bare CNTs. For example, the at least one other element is chosen from metals such as Ag, Au, Pt, Pd, Ru, Rh, Ir, Sr, Ce, Ti, Zr, V, Nb, Cr, Mo, Mn, Fe, Co, Ni, Cu, Zn, Sn, Pb, Sb, Nb, Bi, Hf, Ba, W, Mg, Al, B, P, Li Al, Si, W, and B. For example, the precursor is chosen from elemental metals, metal sulfates, organometallic compounds, coordination inorganic compounds, and metal salts. For example, the metal oxides is chosen from PbO, $MnO_2$, $RuO_2$, $TiO_2$, $IrO_2$, NiO, SnO, $SnO_2$, $Al_2O_3$, MgO, MoO, $V_2O_5$, $Co_3O_4$. For example, the activated carbon manufacture is in a form chosen from batteries, fuel cells, lead acid batteries, electrodes, pseudocapicators, supercapacitors, ultrabatteries, flow battery, adsorbents, composites, and conductive materials. In some embodiments, the activated carbon manufacture the surface area greater than 1500 $m^2/g$ with pore volume 0.6 cc/g.

In some embodiments, there is a method of converting textile solid waste and plastic solid waste into an activated carbon manufacture, comprising subjecting the textile solid waste and plastic solid waste to a preparing process in which one step includes washing the textile or plastic solid waste; stripping the non-carbon-containing substances; cutting and shredding; Degradation of the shredded material in an acid; and subjecting the char to an activation process under a pyrolysis system and a set of conditions in which pyrolysis is at a temperature ranging from 400° C. to 1200° C. and in which at least one other conditions is chosen from impregnation with chemical agents; physical activation in presence of steam/$CO_2$ flow; pyrolysis under $N_2$ atmosphere.

EXEMPLARY PROCESS

Synthesis of Char and Activation Process

In some embodiments, the textile solid waste and plastic solid waste is subjected to a chemical or physical activation process and pyrolysis at a temperature ranging from 300° C. to 1400° C.

Example 1

20 g of shredded textile waste is stirred and decomposed in 50 mL of concentrated sulfuric acid. The mixture is stirred until all the shredded material is completely dissolved in sulfuric acid. During stirring the color change becomes brown and then turns into black with the formation of carbon. The temperature of the mixture can reach up to 150 to 180° C. as the reaction is exothermic. The black char is collected for activation process.

The char that is produced is heated at various temperature ranging from 400° C. to 1,200° C.

Activation Temperature 400° C.

The char is heated at 400° C. in a tube furnace under $N_2$ atmosphere, the rate of heating was 10° C. per minute and the temperature was maintained at 400° C. for 1 hour. After 1 hour, the furnace is turned off and the temperature gradually decreases. The DFT surface area (Density Functional Theory (DFT)) that was observed is 1,632 $m^2$/g with pore volume 0.617 cc/g.

Activation Temperature 600° C.

The char is heated at 600° C. in a tube furnace under $N_2$ atmosphere, the rate of heating was 10° C. per minute and the temperature was maintained at 600° C. for 1 hour. After 1 hour the furnace is turned off and the temperature gradually decreases. The DFT surface area that was observed is 1,073 $m^2$/g with pore volume 0.494 cc/g.

Example 2

Cell Assembly

An appropriate quantity of activated carbon is mixed with sulfuric acid electrolyte and the slurry is prepared, and further pasted on the current collector (carbon coated aluminum foil as current collector z-Flo™ 2653) and the PVA polymer membrane as Separator is used and the pouch cells are prepared. The electrochemical tests such as cyclic voltammetry and galvanostatic experiments are performed. The capacity achieved with respect to the material composition is presented in FIG. 4. In FIG. 4, "Other" means a method not according to this application, and "Wet chemical" refers to a degradation/dehydrating step 210 using sulfuric acid. In each example 1-9 in FIG. 4, the activation was performed using steam and the solid waste is a mixture of textile and plastic solid waste.

As evidenced by examples 1-9, a process according to the present description makes it possible to have a higher surface area capacitor having a higher capacitance.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of converting textile solid waste or plastic solid waste into an activated carbon composite, comprising:
adding, to textile solid waste or plastic solid waste, a composite forming additive chosen from metals, metal oxides, and precursors thereof; carbon nanotubes (CNTs), graphite fibers, and carbon fibers;
performing a degradation and dehydration step on the textile solid waste or plastic solid waste in the presence of the composite forming additive to form a char; and thereafter
subjecting the char to a chemical or physical activation process at a temperature ranging from 300° C. to 1400° C.;
wherein the activated carbon composite obtained is in the form of a composite material structure embedded with metal, metal oxide, carbon nanotubes (CNTs), graphite fibers, or carbon fibers.

2. The method of claim 1, wherein the textile solid waste or plastic solid waste is free of virgin materials.

3. The method of claim 1, wherein the textile solid waste is chosen from natural fiber, organic synthetic fiber, or a mixed type of fiber.

4. The method of claim 1, wherein the textile solid waste has a form chosen from clothing, furniture, carpets, footwear, towels, sheets, cottons, linens, jutes, wood pulp fibers, kapoks, silks, wools, and hairs.

5. The method of claim 1, wherein the plastic solid waste is in a form chosen from containers and packaging, durable goods, and nondurable goods.

6. The method of claim 5, wherein the containers and packaging are chosen from soft drink bottles, lids, and shampoo bottles; wherein the durable goods are chosen from appliances and furniture; and wherein the nondurable goods are chosen from diapers, trash bags, cups, utensils, and medical devices.

7. The method of claim 1, wherein the degradation and dehydration step is performed using a strong acid chosen from sulfuric acid.

8. The method of claim 7, wherein the degradation and dehydration are performed at a temperature ranging from 100 to 200° C. under vacuum or at elevated pressure.

9. The method of claim 1, wherein the activated carbon composite has the form of the composite material structure obtained by adding a composite forming additive chosen from at least one metal element, metal oxide thereof, or a precursor thereof to the textile or plastic solid waste to produce a metal or metal oxide activated carbon matrix during a physical or chemical activation process.

10. The method of claim 1, wherein the activated carbon composite is in the form of the composite material structure obtained by adding a composite forming additive chosen from carbon nanotubes (CNTs) to the reactants during degradation and dehydration step.

11. The method of claim 10, wherein the activated carbon composite has the form of the composite material structure obtained by adding a composite forming additive chosen from at least one metal element, metal oxide thereof, or a precursor thereof to the textile or plastic solid waste to produce a metal or metal oxide activated carbon matrix during the chemical or physical activation process.

12. The method of claim 10, further comprising thereafter washing the char and thereafter drying or evaporating the washed char before performing the chemical or physical activation process.

13. The method of claim 1, wherein the chemical or physical activation process is performed in the presence of graphite fibers or carbon fibers.

14. The method of claim 13, wherein the activated carbon composite is in the form of the composite material structure obtained by adding a composite forming additive chosen from carbon nanotubes (CNTs) to the reactants during degradation and dehydration step.

15. The method of claim 1, wherein the activated carbon composite has pores and surface area are measured using density functional theory (DFT), wherein at least about 40% of the total number of pores have a size ranging from about 2 to about 50 nm; and wherein the activated carbon composite has a surface area ranging from 900 to 3,000 $m^2/g$.

16. The method of claim 15, wherein the activated carbon composite has a pore volume ranging from 0.400 to 0.900 cc/g.

17. The method of claim 1, wherein the activated carbon or composite is further treated in a post-activation process.

18. The method of claim 17, wherein the activated carbon composite is grind milled to produce an average particle size ranging from 3 to 50 μm.

19. The method of claim 18, further comprising fabricating an electrode by dissolving an optional binder in a solvent or dispersing the optional binder in a dispersion medium with the grind milled activated carbon composite to form a composition, applying the composition to a collector, and thereafter removing the solvent or the dispersion medium by drying, leaving behind the binder and activated carbon composite on the collector.

20. The method of claim 17, wherein the activated carbon composite is in a form chosen from batteries, fuel cells, lead acid batteries, electrodes, supercapacitors, pseudocapicators, ultrabatteries, flow battery, adsorbents, composites, and conductive materials.

* * * * *